United States Patent [19]

Hayashi et al.

[11] Patent Number: 4,739,490
[45] Date of Patent: Apr. 19, 1988

[54] RECIPROCATING TRAVELLING SHEAR WITH PLURAL NC CONTROLLERS

[75] Inventors: Shigeki Hayashi; Shigeru Kusaka, both of Machida; Kazuyoshi Komaya, Suita, all of Japan

[73] Assignee: Nusco Kabushiki Kaisha, Tokyo, Japan

[21] Appl. No.: 890,678

[22] Filed: Jul. 30, 1986

[30] Foreign Application Priority Data

Aug. 2, 1985 [JP] Japan ................. 60-170936

[51] Int. Cl.$^4$ .............. B23D 21/00; B23D 25/00
[52] U.S. Cl. ........................ 364/475; 83/71; 83/320
[58] Field of Search .......... 364/474, 475; 83/71, 83/293, 295, 296, 318, 320

[56] References Cited

U.S. PATENT DOCUMENTS

| | | | |
|---|---|---|---|
| 4,196,645 | 4/1980 | Shimizu et al. | 83/320 |
| 4,350,065 | 9/1982 | Hayashi et al. | 83/320 |
| 4,610,281 | 9/1986 | Fuchs et al. | 140/140 |

Primary Examiner—Jerry Smith
Assistant Examiner—Allen MacDonald
Attorney, Agent, or Firm—Pollock, VandeSande and Priddy

[57] ABSTRACT

A first base supporting a lower blade is reciprocated horizontally by rotation of a first motor in one direction only. A second base supporting supporting an upper blade is reciprocated vertically by rotation of a second motor in one direction only. A signal corresponding to the movement of said work, preset length data and a signal corresponding to the rotation of said first motor are fed to first base numerical control means, and the first base is controlled during forward run of the first base by the first base numerical control means such as to follow the running of the work with the work projected by the preset length from the first base. A signal corresponding to the movement of the work or a signal corresponding to the rotation of the first motor, a signal corresponding to the rotation of the second motor and preset length or preset angle data are fed to the second base numerical control means, and the second motor is controlled by the second base numerical control means with the first base following the running of the work. Through the above control, the work is cut to the preset length by an upper blade supported by the second base and a lower blade.

12 Claims, 11 Drawing Sheets

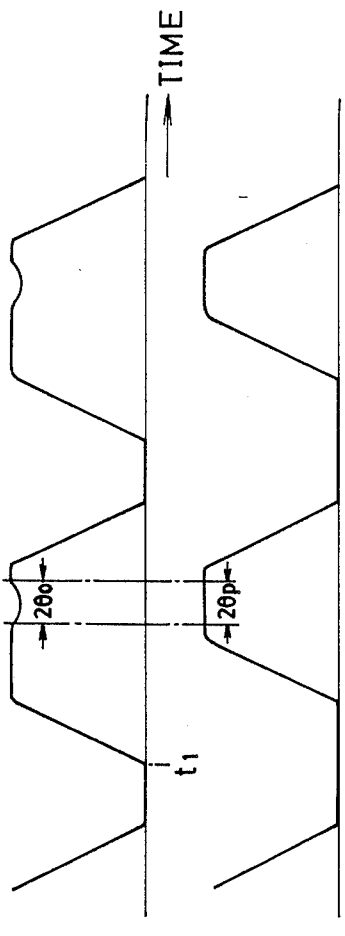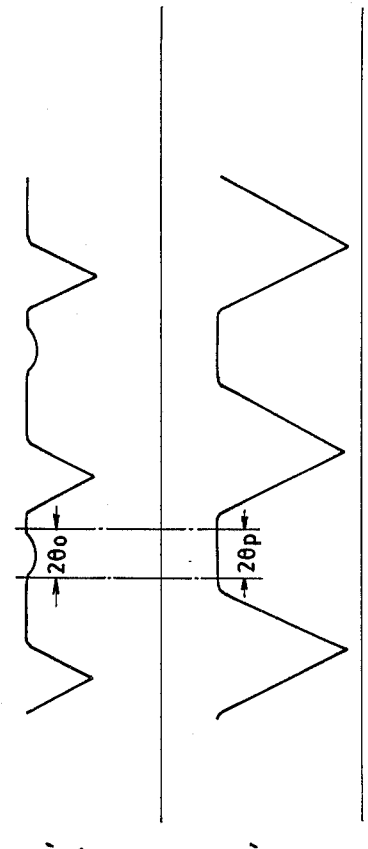
FIG. 6 A
FIG. 6 B
FIG. 6 A'
FIG. 6 B'

RECIPROCATING TRAVELLING SHEAR WITH PLURAL NC CONTROLLERS

BACKGROUND OF THE INVENTION

This invention relates to a running-work processing machine for cutting, bending, punching or performing other processing on a running work, e.g., pipes such as steel pipes and copper pipes, rods, plates, moldings, etc. and, more particularly, positioning control at the time of the processing performed by a numerical control servo loop.

A running-work cutter in a continuous pipe production line will now be described as an example of the prior art. As the running-work cutter of the type noted which is based on numerical control, there are a reciprocal running-work cutter and a rotary running-work cutter. These machines will now be described along with their problems.

Reciprocal running-work cutter

FIG. 1 shows a prior art reciprocal running-work cutter. Length measurement roller 12 is in rolling contact with a running work, i.e., pipe 11. Length measurement encoder 13 is driven by length measurement roller 12. Length measurement encoder 13 generates a pulse every time a predetermined distance is covered by running work 11, these pulses being counter by length measurement counter 14. Counter 14 is cleared in an initial state. The count of counter 14 represents distance $L_1$ covered by work 11 from the instant of clearing of length measurement counter 14.

Cutter support 15 is provided such that it can be reciprocated along work 11. To this end, cutter support 15 is provided with rack 16. Pinion 17 is in mesh with rack 16. The torque of DC motor 18 is coupled through speed reduction gear 19 to pinion 17. Pinion 17 thus is rotated at a reduced speed to cause reciprocation of cutter support 15. Encoder 21 s also driven from DC motor 18, and pulses from encoder 21 are counted by reversible counters 22 and 23. Reversible counters 22 and 23 are cleared in an initial state, and their counts $L_2$ and $L_3$ corresponds to the distance covered by cutter support 15.

Preset cutting length $L_0$ which is set in setter 24 and counts $L_1$ and $L_2$ of counters 14 and 22 are fed to adder 25 to calculate a residual length $L_4=L_0-L_1+L_2$. The residual length $L_r$ is converted by D/A converter 26 into analog signal $V_B$. Pulses from length measurement encoder 13 are fed to F/V converter 29 for conversion into a voltage which is proportional to the pulse repetition frequency, i.e., voltage $V_A$ proportional to the running speed of work 11. Analog subtracter 31 subtracts output voltage $V_B$ of D/A converter 26 from voltage $V_A$ representing the speed of the work. The difference $V_C=V_A-V_B$ which is obtained as a result of substraction is fed to sign detector 32. While sign detector 32 is judging that $V_C=V_A-V_B<0$, i.e., the residual length $L_r$ is sufficiently large, switch 33 is held disconnected from subtracter 31 and connected to D/A converter 34. In the initial state, counter 23 is reset, so that the output of D/A converter 34, which converts the count of counter 23 into analog signal of an opposite polarity, is zero.

The pulse output of encoder 21 is also fed to F/V converter 35, which thus detects the revolving rate of DC motor 18, i.e., running speed of cutter support 15. The output of switch 33 is fed as a reference signal representing a speed reference to subtracter 36, and from this reference signal the output of F/V converter 35 is subtracted as speed feedback. The output of subtracter 36 is fed through amplifier/driver 37 to DC motor 18 to drive the same. DC motor 18 is thus rotated such as to follow the speed reference fed to subtracter 36. In the initial state, the speed reference is zero, and DC motor 18 is stopped. In this state, cutter support 15 is at a home (i.e., start) position.

When work 11 has run to a position such that it projects from a blade of cutter support 15 by a length almost equal to the preset length $L_0$, the output $V_C$ of subtracter 31 becomes positive. This change in sign of $V_C$ is detected as $V_C=V_A-V_B>0$ by sign detector 32, so that switch 33 is switched from the side of D/A converter 34 over to the side of subtracter 31. Thus, DC motor 18 is accelerated in accordance with $V_C$ as speed reference. The running of cutter support 15 is controlled in this way to follow the running of work 11 so as to make the residual length $L_r$ zero, i.e., $V_B=0$. When the residual length $L_r$ approaches zero, a cutting command is produced. As a result, clutch 38 is connected to cause an operation cycle, in which press 43 is lowered and then raised via crank mechanism 42 by the driving of universal motor 41 with flywheel 39. In this operation, upper blade 44 which is mounted above and vertically movable with respect to cutter support 15 is pressed down from above by press 43, thus cutting work 11 in co-operation with lower blade 45 on cutter support 15.

When press 43 completes one vertical reciprocal motion, clutch 38 is disconnected, and counter 14 is cleared by a cutting completion signal from crank mechanism 42. At the same time, the next preset length data $L_0$ is fed to setter 24. As a result, the residual length becomes $L_r=L_0+L_2$, resulting in $V_C=V_A-V_B<0$ so that switch 33 is switched to the side of D/A converter 34. In this state, the count of counter 23 corresponds to a distance covered by movement of cutter support 15 from the home position. The output of D/A converter 34 is of a polarity to cause reverse rotation of DC motor 18. DC motor 18 thus is driven reversely to move cutter support 15 toward the home position. As the home position is approached, the count $L_3$ of counter 23 on one hand is reduced to decelerate DC motor 18, so that cutter support 15 is stopped at the home position. On the other hand, subsequent to the clearance of counter 14, the count $L_1$ of length measurement counter 14 increases with the travel of work 11 to reduce the residual length $L_r$. When a condition $V_C=V_A-V_B24\ 0$ is met again, switch 33 is changed over again to the side of subtracter 31 to repeat the cutting operation noted above.

Rotary running-work cutter

FIG. 2 shows a prior art rotary running-work cutter. In the Figure, parts like those in FIG. 1 are designated by like reference numerals and symbols. In this system, frame-like cutter support 47 is provided for movement along work 11. Cutter support 47 can be moved along two guide rods 48 and 49, and upper blade 44 is supported in cutter support 47 such that it is vertically movable along the cutter support frame. Lower balde 45 is securedly mounted in cutter support 47. Upper blade 44 is rotatably mounted on one end of rotary arm 51, which is secured at the other end to a shaft 50, to which the torque of DC motor 18 is transmitted through speed reduction gear 19. With rotation of DC motor 18, upper blade 14 vertically reciprocates along the frame while the frame of cutter support 47 horizontally reciprocates along guide rods 48 and 49. As a result, upper blade 14 is rotated in the counterclockwise direction in the Figure about shaft 50. Upper blade 44 thus approaches work 11 downwards on the left to cut the work. Each time after completion of the cutting, counters 14 and 22 are cleared. For the positioning control, encoder 21 is driven by DC motor 18, and pulses from encoder 21 are counted by counters 22 and 23. Upper blade 44 returns to the initial position when it completes one rotation. That is, its total displacement along work 11 while it executes one rotation is zero. Like the reciprocal motion case of FIG. 1, adder 25 calculates the residual length $L_r = L'_0 - L_1 + L_2$. However, length data $L_k$ preset in setter 53, which corresponds to one rotation of upper blade 44, is subtracted from preset length data $L_0$ in subtracter 52, the output of which, i.e., the difference $L'_0$, is fed to adder 25.

The output $V_C = V_A - V_B$ from subtracter 31 and output $V_D$ from D/A converter 34 are compared in comparator 54. When $L_0$ is comparatively large and upper and lower blades 44 and 45 are waiting at a home (i.e., start) position, the output $V_D$ of D/A converter 34 is substantially zero. When the residual length $L_r$ is reduced to an extent that $V_C$ exceeds $V_D$, switch 33 is switched according to the output of comparator 54 to feed the output of subtracter 31 as speed reference to subtractr 36. Like the case of FIG. 1, DC motor 18 is accelerated with increase of $V_C$ according to reduction of the residual length. Subsequently, upper and lower blades 44 and 45 are controlled to follow the running of work 11 such as to hold zero residual length (i.e., $V_B = 0$). During this time, upper blade 44 is lowered to cut work 11. In this follow and cutting operation, upper blade 44 executes a circular motion. Therefore, it is necessary to let the component of the motion of upper blade 44 along work 11 to coincide with the movement of work 11. Accordingly, before rotary arm 51 reaches angular position $-\theta_o$ relative to a bottom dead point P ($\theta_o$ defines a designed maximum cutting stroke $D_m$ with which works can be processed by the machine, see FIG. 3), pulses of $1/\cos\theta_o$ per unit length are generated from length measurement encoder 13, and when rotary arm 51 enters a cutting angle range of $\pm\theta_o$, data is read out from memory 55 according to the count of counter 22 which represents the angle of rotation. More specifically, at equiangular intervals $\Delta\theta$ in the range of $\pm\theta_o$, data $\cos\theta_o/\cos\theta$ are read out as compensation coefficients from memory 55. In multiplier 56, the pulse output of length measurement encoder 13 is multiplied in number by each read-out coefficient, and the product is fed to length measurement counter 14. FIG. 4 shows the speed of upper blade 44, i.e., DC motor 18. At instant $t_1$, switch 33 is switched over to the side of subtracter 31, whereupon DC motor 18 is started. The speed of DC motor 18 is subsequently increased up to $1/\cos\theta_o$ times the speed V of work 11. When this speed is reached, it is held. Deceleration and acceleration take place when rotary arm 51 is in the angle range of $\pm\theta_o$. During this time, the positioning with respect to work 11 and speed follow are effected. Also, cutting is effected.

When rotary arm 51 clears angular position $\pm\theta_o$ at instant $t_2$, length measurement counter 14 is cleared. At the same time, the next cutting length $L_0$ is preset in setter 24, so that the residual length is increased. Also at this time, data $L_h$ from $+\theta_o$ till the home position is preset in counter 23. Counter 23 performs down-counting, but the polarity of the output of D/A converter 34 remains the same. If $L_0$ is large at this time, $V_C = V_A - V_B$ is less than $V_D$, so that switch 33 is switched over to the side of D/A converter 34. Thus, deceleration sets in when upper and lower blades 44 and 45 approach the home position. When a condition $V_C \geq V_D$ is subsequently met as a result of the reduction of the residual length, DC motor 18 is driven again. The above sequence of operations is repeated.

The reciprocal running-work cutter shown in FIG. 1 is best suited where the processing on work while the work in running takes time. In addition, it is possible to cut work 11 with cutter support 15 by on-off operating clutch 38 even when work 11 is running at a very low speed or when it is stopped. However, it is necessary to cause reciprocation of cutter support 15, that is, it is necessary to cause reserve rotation of DC motor 18 after a forward rotation thereof. Therefore, one cycle of operation inevitably takes a comparatively long time. This means that a small number of times of cutting can be obtained per minute, and it is difficult to obtain cutting into a small length.

In the rotary running-work cutter shown in FIG. 2, DC motor 18 is driven in a fixed direction at all time, and the cutter returns to the home position while it is rotated forwardly. Thus, it is possible to repeat operation at a small interval by causing acceleration and deceleration of DC motor 18 only in one direction. This rotary running-work cutter, however, has the following drawbacks:

(a) The force applied to work 11 for cutting or like processing of the work is obtained from DC motor 18 for moving the cutter support. Therefore, a high horsepower motor is required as DC motor 18. The horsepower of the motor can be reduced by making use of rotational energy stored after a cutting until the next cutting, i.e., by making use of the flywheel effect. In this case, however, it is possible to provide only the speed synchronized to work 11 because numerical control of DC motor 18 is done to follow the running of work 11. Therefore, the blade can not be moved while work 11 is stationary. Also, while the work is moving at a low speed, the flywheel effect is liable to be insufficient, resulting in an insufficient cutting force. If a flywheel or the like is provided to increase the momentum, an increased horse-power is required for the acceleration and deceleration for positioning.

(b) To cut thicker pipes or plates, it is necessary to increase the cutting angle $\theta_o$ shown in FIG. 3. However, the circular motion of the upper blade is compensated for as described before. That is, the speed of rotary arm 51 is set to $1/\cos\theta_o$ times the speed of the work until reaching the angle $-\theta_o$, and DC motor 18 is decelerated when rotary arm 51 enters the cutting angle range of $\pm\theta_o$. However, if the magnitude of deceleration is unity when $\theta_o = 30°$, it amounts to 2.12 when $\theta_o = 45°$ and to 3.46 when $\theta_o = 60°$. The required horse-power is correspondingly increased. In order to increase the maximum cutting stroke $D_m$ of rotary arm 51 without increasing the cuting angle $\theta_o$, it is necessary to increase the radius of rotation of upper blade 44, i.e., the length of rotary arm 51. Doing so extremely increases the scale of the entire machine.

SUMMARY OF THE INVENTION

An object of the invention is to provide a running-work processing machine, which permits an increased number of processing cycles per unit minute permits processing of a work even when the work is being moved at a low speed or is stationary, does not require a high horse-power motor and permits accurate positioning control.

According to the invention, a first base such as a cutter support is reciprocated with operation of a first motor in one direction, while a second base such as a press is vertically moved with operation of a second motor in one direction.

A signal related to the movement of a work, a signal related to the driving of the first motor, and preset length data are fed to first base numerical control means, so that the first motor is speed controlled by this first numerical control means. During its forward run, the first base is caused to follow the running of the work in such state of the work that it projects by a predetermined length from the first base. A signal related to the movement of the work, a signal related to the driving of the first motor, preset length or preset angle data and a signal related to the driving of the second motor are fed to second base numerical control means. The second motor is speed controlled by this second numerical control means, whereby the second base effects processing on the work together with the first base in a state that the running of the work is followed by the first base.

Both the reciprocal driving of the first base and vertical driving of the second base are effected with the driving of motors in one direction. Thus, the processing cycle can be repeated at a reduced interval of time. Further, since the first and second bases are driven from separate motors, it is possible to overcome the drawbacks noted before in case where the rotation of the upper blade and movement of the cutter support from a single motor. Further, since there is no need of synchronizing the vertical operation of the second base to the speed of the work, it is possible to increase the length of the vertical operation (i.e., vertical cutting stroke) without need of using any high horse-power motor. Further, it is possible to perform processing on the work which is being moved at a low speed or stationary by operating the sole second base.

BRIEF DESCRIPTION OF THE DRAWINGS

FIG. 5, comprising

FIG. 6 is a graph showing an example of speed control of motor 18 in FIG. 5;

FIG. 6B is a graph showing an example of speed control of motor 66 corresponding to FIG. 6A;

FIG. 6A' is a graph showing a different example of speed control of motor 18;

FIG. 6B' is a graph showing an example of speed control of motor 66 corresponding to FIG. 6A';

DETAILED DESCRIPTION OF THE PREFERRED EMBODIMENTS

Figure 1:
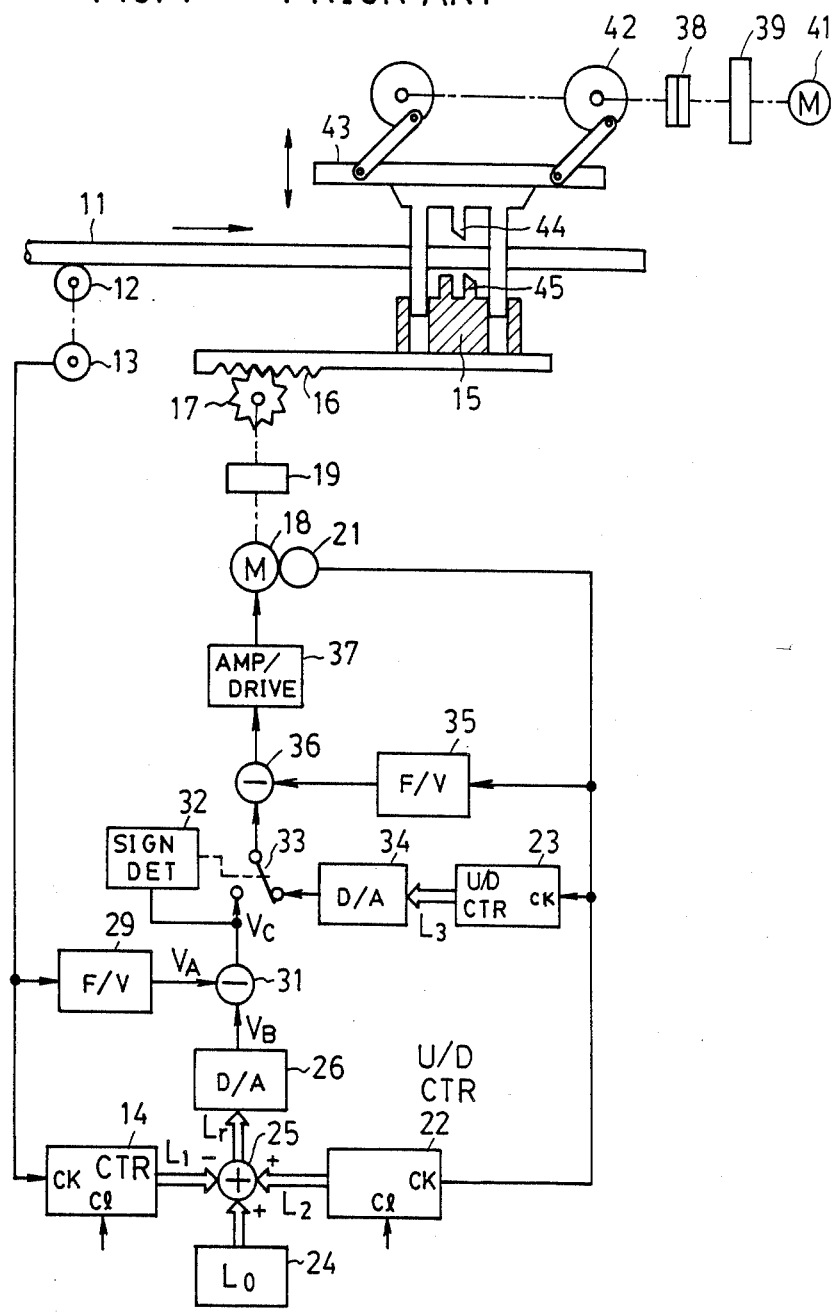
FIG. 1 is a schematic representation of a prior art reciprocal running-work cutter.
Figure 2:
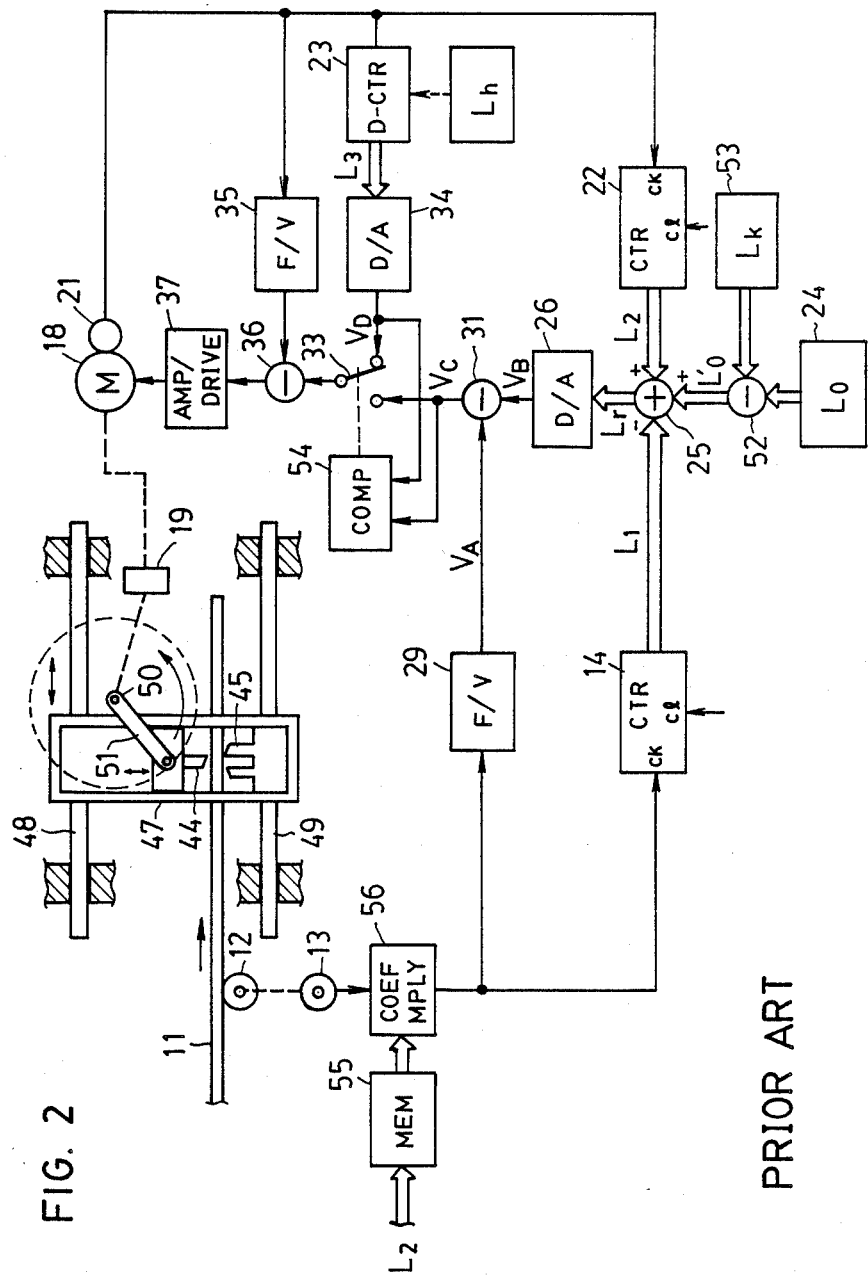
FIG. 2 is a schematic representation of a prior art rotary running-work cutter.
Figure 3:
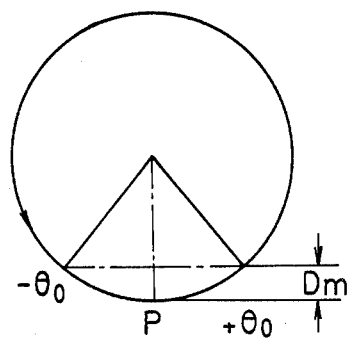
FIG. 3 is a view showing the relation between an orbit of rotation and maximum cutting stroke of upper blade 44 in the running-work cutter shown in FIG. 2.
Figure 5A:
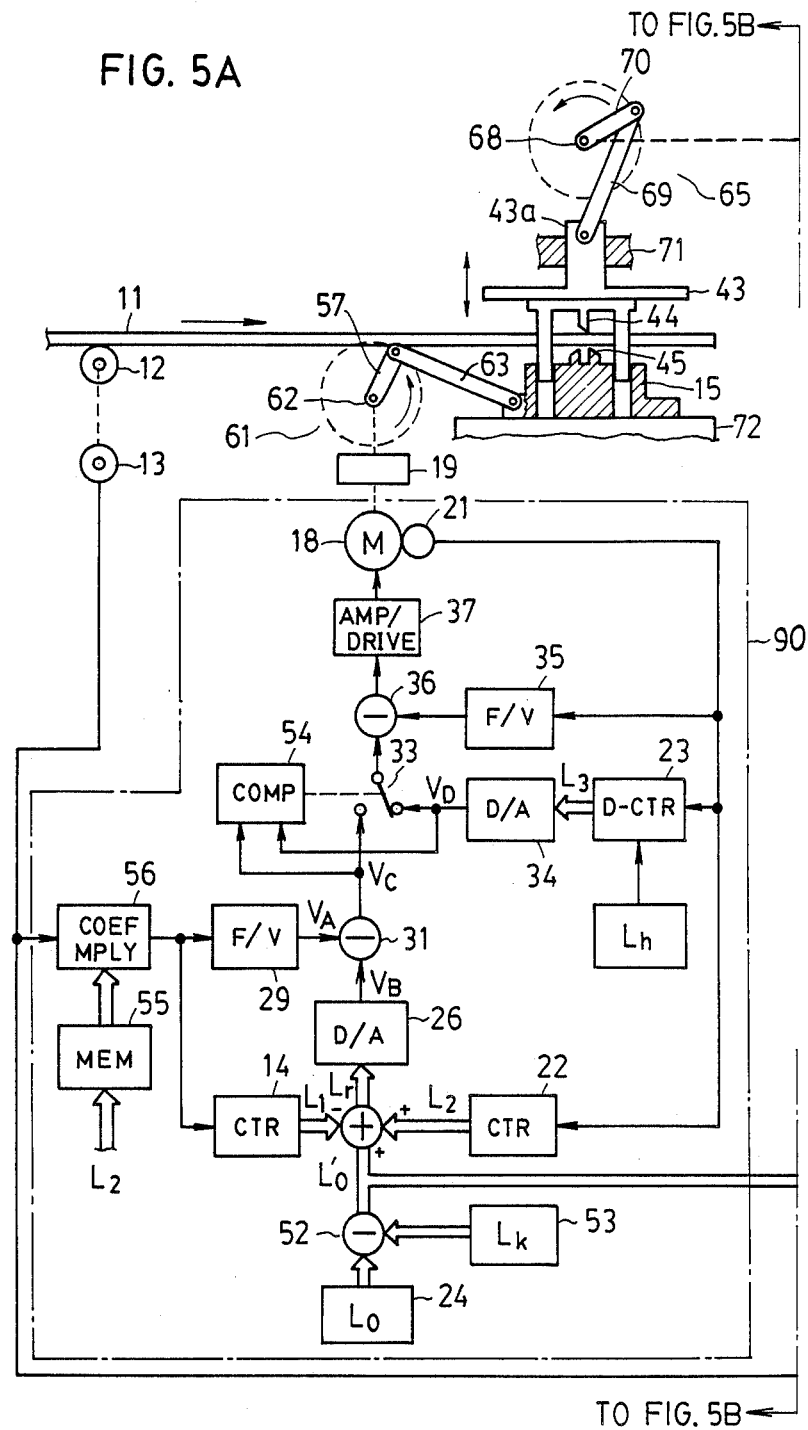
FIGS. 5A and 5B, is a schematic representation of an embodiment of the running-work processing machine according to the invention applied to a running-work cutter.
Figure 5B:
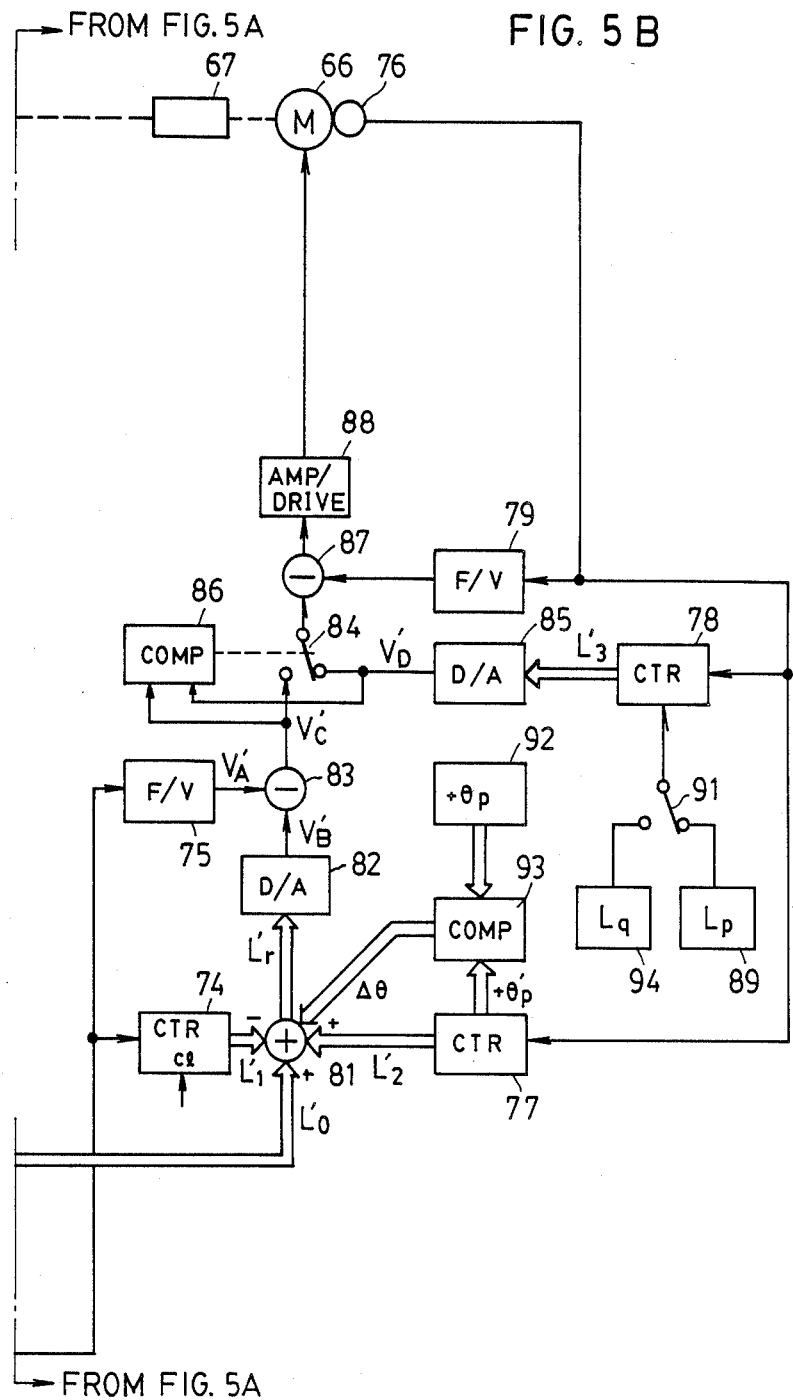

FIG. 5 shows an embodiment of the invention. In the Figure, parts like those in FIGS. 1 and 2 are designated by like reference numerals and symbols. In this embodiment, a crank mechanism, i.e., reciprocal drive mechanism 61, is provided for causing reciprocation of cutter support 15 in the direction of running of work 11 with rotation of DC motor 18 in one direction only. Reciprocal drive mechanism 61 is constructed, for instance, as follows. The torque of DC motor 18 is transmitted through speed reduction gear 19 to crankshaft 62. Connecting rod 63 is coupled at one end to a crank arm 56 secured to crankshaft 62 and coupled at the other end to cutter support 15. Any other construction may be used as reciprocal drive mechanism 61 as well so long as a unidirectional rotary motion is converted into a reciprocal translational motion.

The positioning and follow control for reciprocal drive mechanism 61 with respect to work 11 during forward run (in the same direction as work 11) are effected by a first numerical control system. This control system may be realized with the same construction as in the prior art rotary running-work cutter shown in FIG. 2. In the embodiment of FIG. 5, however, motor 18 is used only for the driving and control of the first base, i.e., cutter support 15, and it is not used for the driving and control of upper blade 44. The system for controlling cutter support 15 by motor 18 constitutes first base numerical control means.

In this embodiment, a further crank mechanism, i.e., vertical drive mechanism 65, is provided for vertically driving upper blade 44. Vertical drive mechanism 65 may be of any construction so long as a vertical movement of the second base, i.e., press 43 in this embodiment, is caused with rotation of DC motor 66 in one direction only. In the illustrated construction, the torque of DC motor 66 is coupled, after speed reduction by speed reduction gear 67 if necessary, to crankshaft 68. Crank arm 70 is coupled at one end to crankshaft 68 and at the other end to connecting rod 69, which is in turn coupled at the other end to press 43. Press 43 has guide post 43a extending upright from its base at the central portion thereof. Guide post 43a is vertically movable through guide 71. Connecting rod 69 is coupled to the top of guide post 43a. Press 43 faces stationary base 72, and cutter support 15 is reciprocated through the space between press 43 and stationary base 72.

In this embodiment, second base numerical control means effects follow control of the second base, i.e., press 43, with respect to the running of work 11 such that a predetermined range of vertical movement of the second base caused by vertical drive mechanism 65 synchronizes with a follow range of cutter support 15 with respect to work 11. This follow control is attained with a similar construction to the one for the follow control of cutter support 15 with respect to work 11. More specifically, pulses from length measurement encoder 13 are counted by counter 74 and are also fed to F/V converter 75. Encoder 76 is driven from DC motor 66, and its pulse output is fed to counters 77 and 78 and F/V converter 79. The count $L'_1$ of counter 74, output values $L'_0$ ($L'_0 = L_0 - L_k$) from subtracter 52 corresponding to a preset length and count $L'_2$ of counter 77 are fed to adder 81. From these data, adder 81 calculates a value $L'_r = L'_0 - L'_1 + L'_2$ corresponding to the residual length. This value is converted by D/A converter 82 into an analog signal $V'_B$. The analog signal $V'_B$ and output $V'_A$ of F/V converter 75 are fed to subtracter 83, which produces a difference output $V'_C = V'_A - V'_B$ which is fed to switch 84. Meanwhile, the count $L'_3$ of counter 78 is converted by D/A converter 85 into an analog signal $V'_D$. This signal $V'_D$ and signal $V'_C$ are compared in comparator 86 and are switched one over to the other as a result of the comparison to be fed as a speed reference to subtracter 87, to which is also fed the output of F/V converter 79. The output of subtracter 87 is fed through amplifier/driver 88 to motor 66 to drive the same. Motor 66 is thus controlled to follow the input speed reference. It is enough to operate press 43 in a state where cutter support 15 has been positioned relative to work 11 and is performing the follow operation. Thus a control system for press 43 does not include any component corresponding to memory 55 and multiplier 56.

Operation

Figure 4:
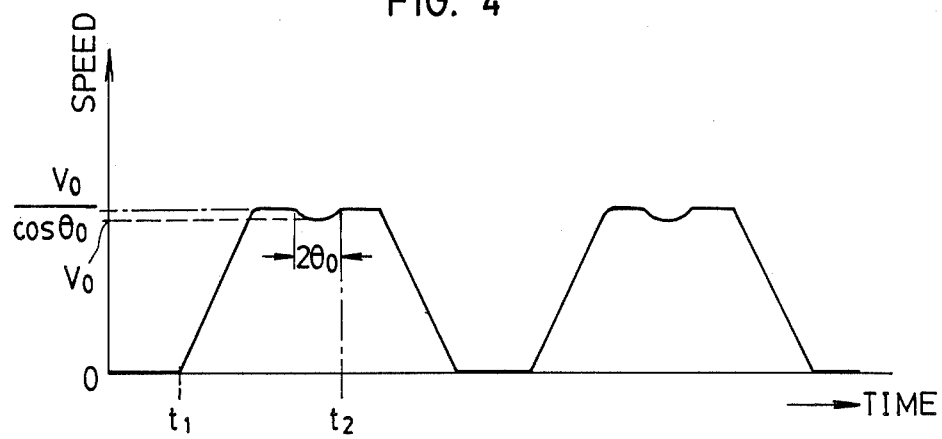
FIG. 4 is a graph showing an example of speed control of motor 18 shown in FIG. 2.

Like the case of the rotary running-work cutter shown in FIG. 2, counters 14 and 22 are cleared when the rotational angle of crankshaft 62 reaches angle $+\theta_o$ at the end of the follow operation angle range of $\pm\theta_o$. In the embodiment of FIG. 5, counters 74 and 77 are also cleared. At the same time, a value $L_h$ representing the angle from $+\theta_o$ to the home position is preset. A value $L_p$ corresponding to an angle from the angle $+\theta_p$ at the end of an angle range of $\pm\theta_p$, which corresponds to the maximum stroke (i.e., maximum follow operation range $\pm\theta_o$) of press 43 to the home angular position of press 43 is preset in counter 78 from setter 89 through switch 91 at the time of presetting of data in counter 23. Numerical control of DC motor 18, i.e., cutter support 15, is effected in the same way as in the case of FIG. 2. Therefore, when the preset cutting length $L_0$, to which work 11 is cut, is comparatively large, the speed of motor 18 is controlled as shown in FIG. 6A, similar to the case of FIG. 4. Control of press 43, i.e., motor 66, on the other hand, is performed as shown in FIG. 6B. As is shown, while crankshaft 62 is in the angle range of $\pm\theta_o$, crankshaft 68 is in an angle rnage of $\pm\theta_p$. In this angle range, the speed is held constant. When the preset length $L_0$ is comparatively small, motors 18 and 66, although they are decelerated after the cutting operation, are accelerated again without being stopped, as shown in FIGS. 6A' and 6B'.

If necessary, immediately before counters 14 and 77 are cleared, the count of counter 77 (corresponding to angle $+\theta'_p$) and a reference value from setter 92 (corresponding to angle $+\theta_p$) may be compared in comparator 93. If the two inputs are not coincident, i.e., if there is a deviation between the control of cutter support 15 and control of press 43, a value corresponding to the difference between $+\theta_p$ and $+\theta'_p$ may be fed from comparator 93 to adder 81 to compensate for the deviation. With this arrangement, the two control systems can be held synchronized when the cutting operation is performed repeatedly.

For use where work 11 is moving at a very low speed $V_0$ or is stationary, the system is designed to perform as follows. When the speed of work 11 becomes lower than a predetermined value, switch 84 remains connected to D/A converter 85, and no operation of comparison is performed in comparator 86. Also, switch 91 is connected to the side of setter 94, in which a value $L_q$ corresponding to one vertical excursion is set. When crankshaft 62 has passed by the angular position $-\theta_o$, the value $L_q$ is preset in counter 78. As a result, press 43 is promptly caused to execute one vertical execution. For cutting a stationary work, the data $L_q$ is preset in counter 78 through manual operation of a switch (not shown) when cutter support 15 is in the stationary state. As a result, one vertical execution of press 43 is caused.

The construction described above may be modified variously. Any construction may be employed so long as cutter support 15 and press 43 are positioned during operation in fixed angle ranges of $\pm\theta_o$ and $\pm\theta_p$ through speed control of respective drive motors 18 and 66 rotated in one direction only. Further, while the above description has been concerned with the processing of cutting a running work, the invention is applicable to any running-work processing with a combination of two processing units, e.g., punching, boring, notching, bending, folding, etc.

Further, although the individual components of the above embodiment have been shown as hardware, it is possible to perform the functions of various parts using an electronic computer. For example, the functions of counters 14, 22, 23, 74, 77 and 78, adders 25 and 81, subtracter 52, comparators 54, 86 and 93, memory 55 and coefficient multiplier 56 may be performed by a single electronic computer.

Further, in the above embodiment the speed control is performed as analog control using the D/A and F/V converters. However, it is possible to realize the speed control as digital control. In this case, no analog converter such as D/A and F/V converters is necessary.

Figure 7:
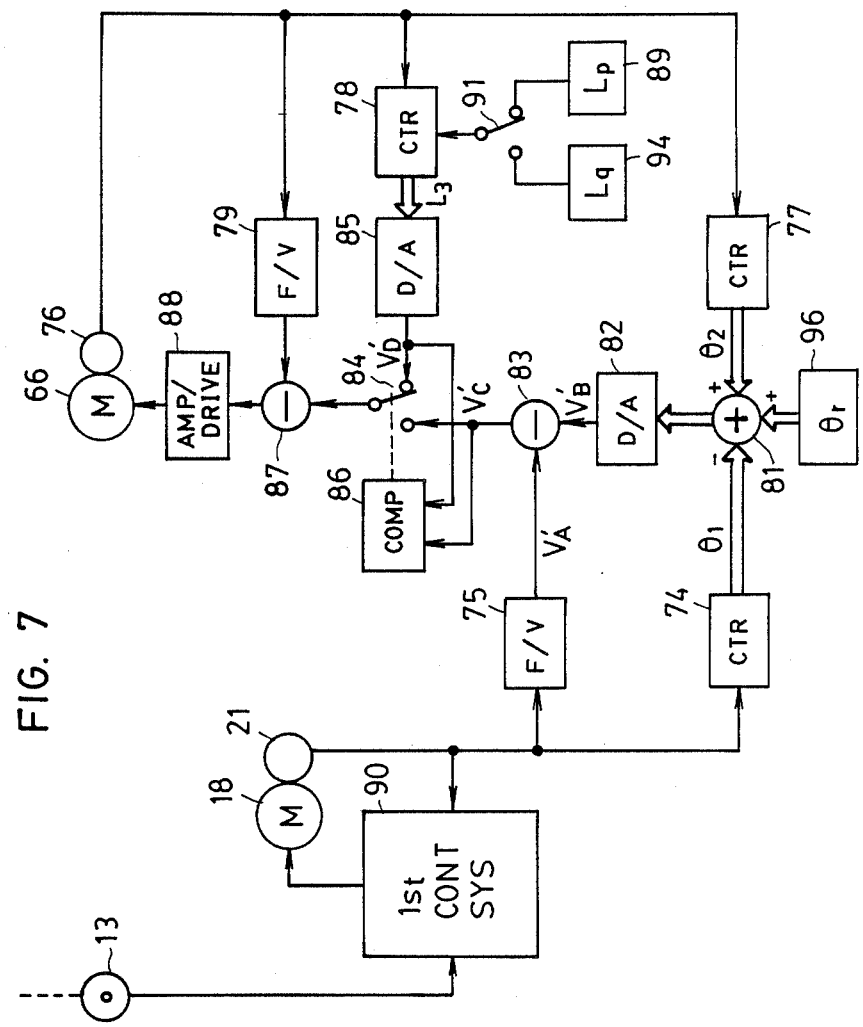
FIG. 7 is a schematic representation of an essential part of a system for numerical control of motor 66 in relation to a signal corresponding to the rotation of motor 18.

Further, in the above embodiment the control of press 43 is performed in effect in synchronism with the control of cutter support 15. This means that it is possible to arrange the control of press 43 in connection with the controlled operation of motor 18. FIG. 7 shows an essential part of a system which performs such a control, wherein control system 90 for motor 18 is identical with that shown in FIG. 5. In this instance, pulses from encoder 21 which is driven from motor 18 for driving cutter support 15 are fed to counter 74 and F/V converter 75. In this case, a value $\theta_r$ is set in setter 96 such that when the angular position of crankshaft 62 is $-\theta_o$ the angular position of crankshaft 68 would be $-\theta_p$. When crankshaft 68 of press 43 reaches $-\theta_p$, it is subsequently controlled to perform a follow operation such that crankshaft 68 reaches $+\theta_p$ until crankshaft 62 of cutter support 15 reaches $+\theta_o$. The subsequent operation is the same as in the case of FIG. 5.

Figure 8:
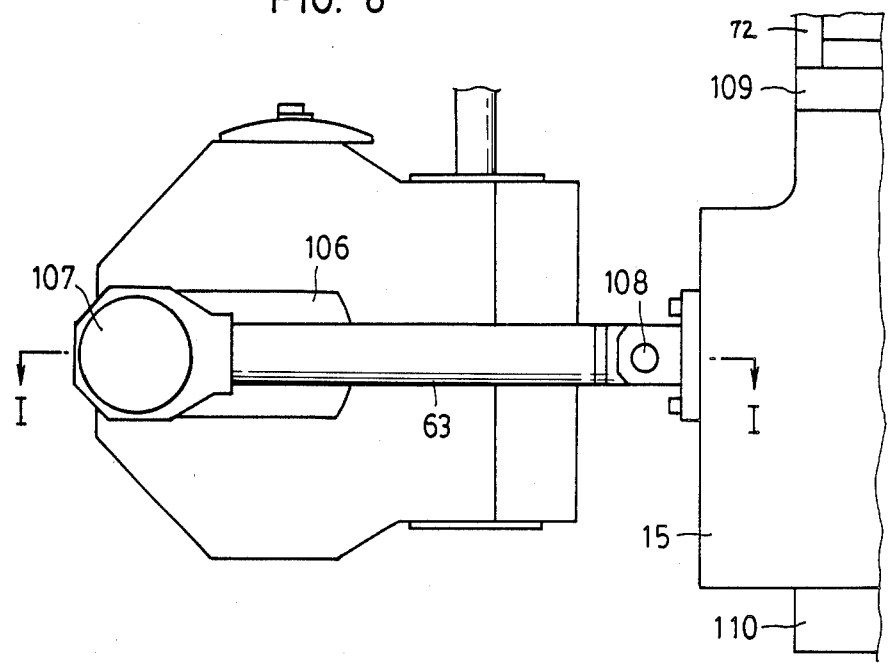
FIG. 8 is a plan view showing a different example of reciprocal drive mechanism 61.
Figure 9:
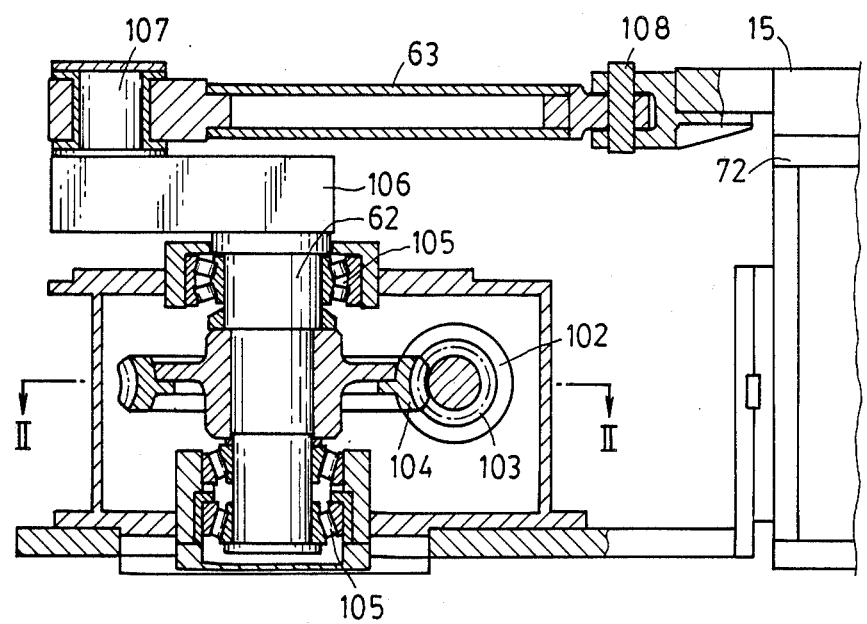
FIG. 9 is a sectional view taken along line I—I in FIG. 8.
Figure 10:
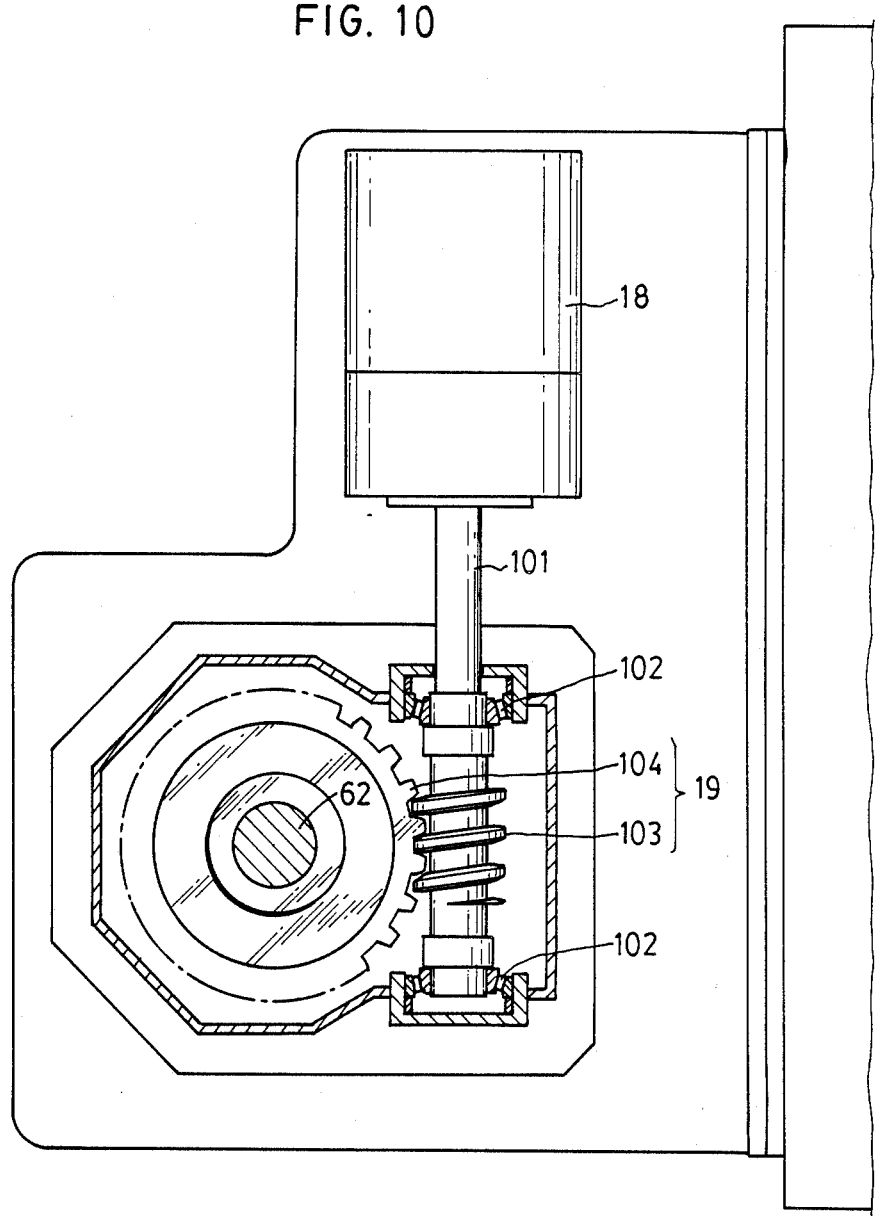
FIG. 10 is a sectional view taken along line II—II in FIG. 9.

Reciprocal drive mechanism 61 in FIG. 5 may also be modified variously. FIGS. 8 to 10 illustrate a modification of the mechanism. As shown in FIG. 10, the torque of motor 18 is subjected to speed reduction by speed reduction gear 19. Shaft 101 of speed reduction gear 19 extends horizontally and is journalled in bearing 102. Shaft 101 is provided with worm gear 103 in mesh with worm wheel 104. The shaft of worm wheel 104 extends vertically and serves as crankshaft 62, as shown in FIG. 9. Crankshaft 62 is journalled in bearing 105. Crank 106 is secured at one end to the upper end of crankshaft 62, and one end of connecting rod 63 is rotatably coupled by pin 107 to the other end of crank 106. Connecting rod 63, as shown in FIGS. 8 and 9, extends horizontally, and its other end is rotatably coupled by pin 108 to one end of cutter support 15. Cutter support 15 is provided on stationary base 72. Stationary base 72, as shown in FIG. 8, is provided with guides 109 and 110 for guiding cutter support 15.

Rotation of motor 18 causes rotatin of worm 103 to cause rotation of crankshaft 62 so as to cause rotation of crank 108 in a horizontal plane, thus causing reciprocation of cutter support 15 to the left and right in FIG. 8.

Figure 11:
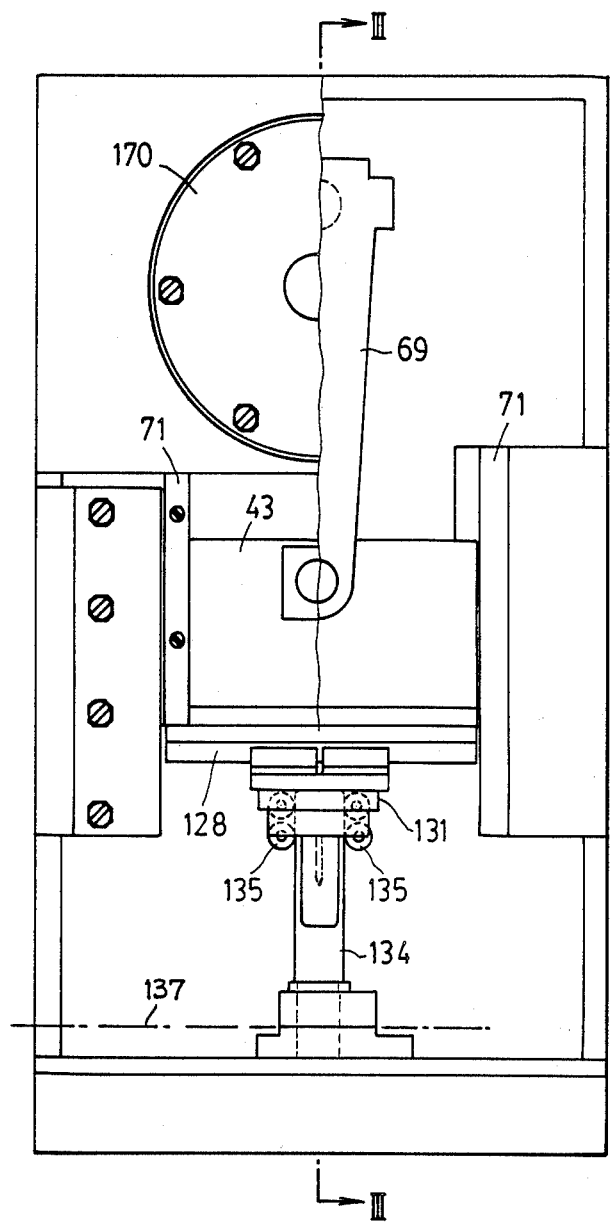
FIG. 11 is a front view showing a different example of vertical drive mechanism 65.
Figure 12:
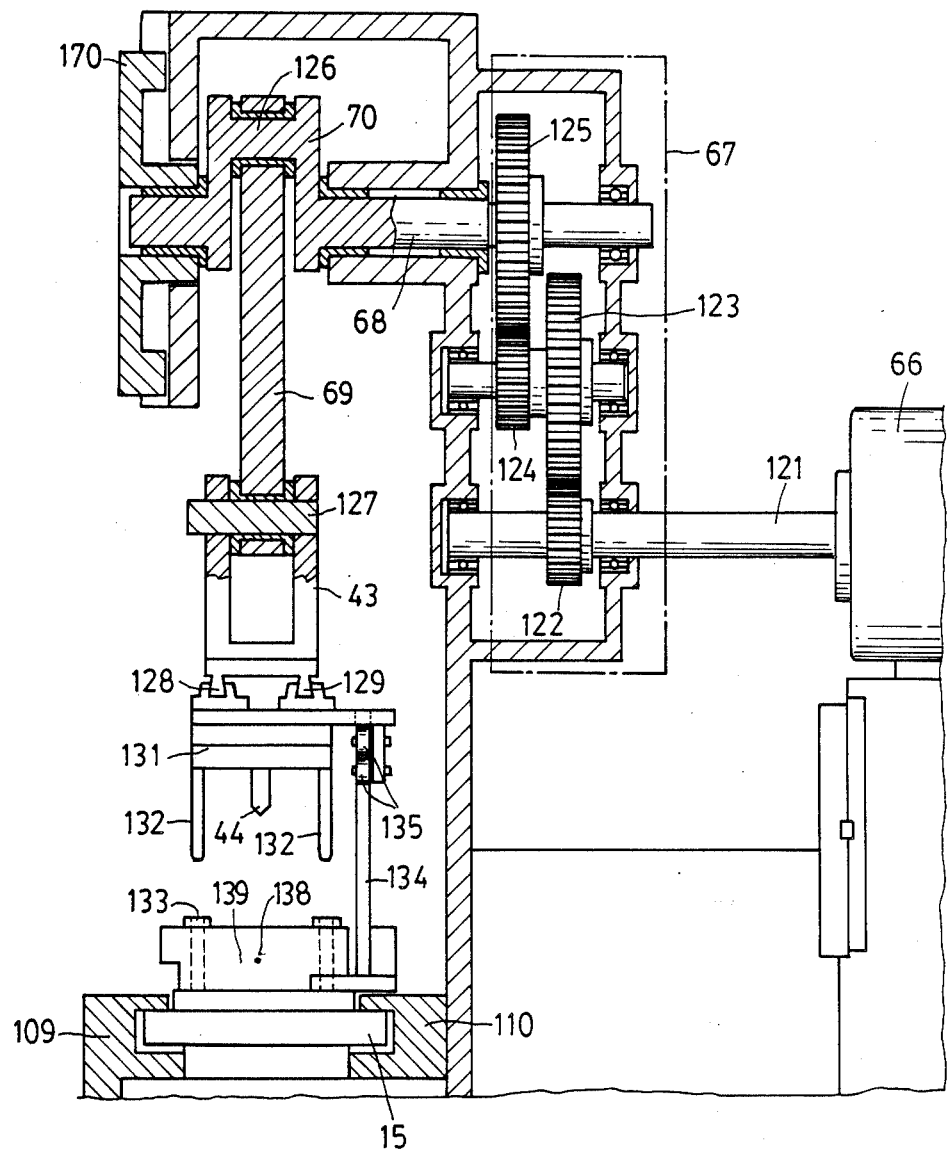
FIG. 12 is a sectional view taken along line II—II in FIG. 11.

Vertical drive mechanism 65 in FIG. 5 may also be modified. FIGS. 11 and 12 show a modification of the mechanism. The torque of motor 66 is subjected to speed reduction by speed reduction gear mechanism 67 consisting of gears 122 to 125. The shaft of the speed reduction gear mechanism extends horizontally and serves as crankshaft 68. Crank 70 is secured at one end to crankshaft 68, and one end of connecting rod 69 is rotatably coupled by pin 126 to the other end of crank 70. Connecting rod 69 extends vertically, and press 43 is rotatably coupled by shaft 127 to the lower end of connecting rod 69. Press 43 can be vertically moved with its opposite sides guided by guides 71. Rails 128 and 129 are provided on the bottom of press 43 and extend therefrom in the direction of movement of work 11. Upper blade base 131 is mounted on press 43 for reciprocal movement along rails 128 and 128, i.e., in the direction of movement of work. Upper blade 44 is mounted on upper blade base 131. Guide posts 132 extend downwardly from upper blade base 131. Cutter support 15 has post guide holes 133, in which guide posts 132 are slidably inserted. Coupling plate 134 extends upright from one side of cutter support 15. Coupling plate 134 is pinched from the opposite sides in the direction of movement of work by rollers 135 mounted on upper blade base 131. Thus, when cutter support 15 is moved by reciprocal drive mechanism 61, upper blade base 131 is also moved together with cutter support 15 via coupling plate 134 and rollers 135. Further, when motor 66 is rotated, crankshaft 68 is rotated, and also crank 70 is rotated, thus causing vertical movement of press 43 and also vertical movement of upper balde base 131. Flywheel 170 is mounted on crank 68. The work runs along line 137 shown in FIG. 11. It runs in a direction perpendicular to the plane of FIG. 12 past point 138. The shapes of upper and/or lower blades 44, 139 on cutter support 15 is selected in dependence upon the work to be processed.

As has been described in the foregoing, the first base (i.e., cutter support 15) is reciprocated by a motor rotated in a fixed directin with its positioning and follow control with respect to the work being effected through numerical control, while the second base (i.e., press 43) is vertically moved by a motor rotated in a fixed direction with its positioning being effected through numerical control. Thus, it is possible to repeat the processing (i.e., cutting) an increased number of times per unit time.

Further, the control fo the first base and control of the second base are performed by separate control systems, and the second base need not be synchronized to the speed of the work. Thus, there is not need of compensation for the conversion of circular motion of the crank into translational reciprocal motion, i.e., there is no need of providing the control system shown in FIG. 5B with components corresponding to memory 55 and coefficient multiplier 56 shown in FIG. 5A. This means that it is possible to increase the maximum vertical stroke of the processing body; for instance, it is possible to set $\theta_p$ to 60° to 90°. It is thus possible to increase the stroke without need of increasing the radius of rotation of crank 70, i.e., without increasing the size of the processing machine as a whole. Further, the angle range $\pm\theta_o$ of crankshaft 62 for driving the base with respect to the work can be made to be comparatively small, e.g., smaller than 30°. Further, satisfactory operation and highly precise positioning control can be achieved without use of a substantially high horse-power motor as drive motor 18.

Furthermore, since the control of the first base and the control of the second base are independent, the second base can be driven at a high speed even when the work is being moved at a low speed or stationary. Thus, it is possible to store rotational energy of motor 66, make effective use of the flywheel effect and in effect use a small size motor as motor 66.

What is claimed is:

1. A running work processing machine comprising:
   a first motor;
   a first base mounted for horizontal reciprocation along the direction of running movement of a work;
   a first crank mechanism connected between said first motor and said first base for converting unidirectional rotation of said first motor into horizontal reciprocal movement of said first base;
   a second motor;
   a second base disposed above said first base, said second base being stationary horizontally and being vertically reciprocable;
   a second crank mechanism covered between said second motor and said second base for converting unidirectional rotation of said second motor into vertical reciprocal movement of said second base;
   processing means disposed between said first and second bases, said processing means being driven by said second base to process said work;
   means for generating signals corresponding to the movement of said work and corresponding to the rotations of said first and second motors;
   first base numerical control means for effecting numerical control of the unidirectional rotation of said first motor at least during forward run of said first base in response to said signal corresponding to the movement of said work, preset length data, and said signal corresponding to the rotation of said first motor so as to cause said first base to follow the running of said work with said work projecting ahead of said processing means by a length corresponding to said preset length data; and
   second base numerical control means for effecting numerical control of the unidirectional rotation of said second motor in response to said signal corresponding to the movement of said work, said signal corresponding to the rotation of said second motor, and a preset value such that the vertical reciprocation of said second base causes said processing means to process said work while said first base is following the running of said work.

2. A running work processing machine comprising:
a first motor;
a first base mounted for horizontal reciprocation along the direction of running movement of a work;
a first crank mechanism connected between said first motor and said first base for converting unidirectional rotation of said first motor into horizontal reciprocal movement of said first base;
a second motor;
a second base disposed above said first base, said second base being stationary horizontally and being vertically reciprocable;
a second crank mechanism connected between said second motor and said second base for converting unidirectional rotation of said second motor into vertical reciprocal movement of said second base;
processing means disposed between said first and second bases, said processing means being driven by said second base to process said work;
means for generating signals corresponding to the movement of said work and corresponding to the rotations of said first and second motors;
first base numerical control means for effecting numerical control of the unidirectional rotational of said first motor at least during forward run of said first base in response to said signal corresponding to the movement of said work, preset angle data, and said signal corresponding to the rotation of said first motor so as to cause said first base to follow the running of said work with said work projecting ahead of said processing means by a length that is determined by said preset angle data; and
second base numerical control means for effecting numerical control of the unidirectional rotation of said second motor according to said signal corresponding to the rotation of said first motor, said signal corresponding to the rotation of said second motor, and a preset value such that the vertical reciprocation of said second base causes said processing means to process said work while said first base is following the running of said work.

3. The running work processing machine according to claim 1 or 2 which further comprises processing control means for causing, upon actuation thereof, one vertical reciprocation of said second base disregarding the control by said second base numerical control means when the speed of said work is lower than a predetermined value.

4. The running work processing machine according to claim 1 wherein said second base numerical control means includes:
first counting means for counting said signal corresponding to the movement of said work;
second counting means for counting said signal corresponding to the rotation of said second motor;
first adder means for subtracting the count of said first counting means from the preset value and adding the count of said second counting means to the resultant difference;
digital-to-analog converter means for converting the sum output of said first adder means into an analog signal;
first speed conversion means for obtaining a signal corresponding to the speed of movement of said work from said signal corresponding to the movement of said work;
first subtracter means for producing a difference between the output of said first speed conversion means and the output of said digital-to-analog conversion means;
second speed conversion means for obtaining a signal corresponding to the rotational speed of said second motor from said signal corresponding to the rotation of said second motor; and
first driver means for receiving the output of said second speed conversion means and the output of said first subtracter means and driving said second motor such as to follow a speed reference represented by said first subtracter means output.

5. The running-work processing machine according to claim 4, which further comprises:
first returning means for returning said second base from a predetermined position to a home position; and
first switching means for switching said second base numerical control means over to said first returning means during at least part of a period other than the period of control of said second motor by said second base numerical control means with said first base following the running of said work.

6. The running-work processing machine according to claim 5, which further comprises:
compensating means for comparing the count of said second counting means to a preset value at a predetermined instant of time after one vertical reciprocation of said second base and feeding the resultant difference as a compensation value of said first adder means.

7. The running work processing machine according to claim 5,
in which said first base numerical control means includes:
fourth counting means for counting said signal corresponding to the movement of said work;
fifth counting means for counting said signal corresponding to the rotation of said first motor;
second adder means for subtracting the count of said fourth counting means from a value corresponding to said preset length data and adding the count of said fifth counting means to the resultant difference;
second digital-to-analog conversion means for converting the sum output of said second adder means into an analog signal;
third speed conversion means for converting said signal corresponding to the movement of said work into a signal corresponding to the speed of movement of said work;
second subtracter means for producing a difference between the output signal of said third speed conversion means and the output analog signal of said second digital-to-analog conversion means to thereby obtain a second speed reference;
fourth speed conversion means for conversion said signal corresponding to the rotation of said second motor into a signal corresponding to the rotation of said first motor; and
second driver means for receiving the output signal of said fourth speed conversion means and said second speed reference and driving said first motor such that the rotation of said first motor follows said second speed reference;
said running work processing machine further comprising:

second returning means for returning said first base from a predetermined position to a home position; and second switching means for switching said first base numerical control means over to said second returning means during at least part of a period other than the period of control of said first motor during forward run of said first base according to the output of said second subtracter means.

8. The running-work processing machine according to claim 7, which further comprises:

means for compensating the count of said fourth counting means and said signal corresponding to the movement of said work fed to said third speed conversion means such as to make the speed of said first base substantially uniform during a period, during which said first base is following the speed of said work.

9. The running-work processing machine according to claim 8, wherein said first base supports a lower blade, said second base supports an upper blade, and said work is cut by said lower and upper blades.

10. The running work processing machine according to claim 2 wherein said second base numerical control means includes:

first counting means for counting said signal corresponding to the rotation of said first motor;

second counting means for counting said signal corresponding to the rotation of said second motor;

first adder means for subtracting the count of said first counting means from said preset angle data and adding the count of said second counting means to the difference;

digital-to-analog conversion means for converting the sum output of said first adder means into an analog signal;

first speed conversion means for converting said signal corresponding to the rotation of said first motor into a signal corresponding to the speed of rotation of said first motor;

subtracting means for producing the difference between the output of said first speed conversion means and the output of said digital-to-analog conversion means as a speed reference;

second speed conversion means for converting said signal corresponding to the rotation of said second motor into a signal corresponding to the rotational speed of said second motor; and driver means for receiving the output of said second speed conversion means and said speed reference and driving said second motor such as to follow said speed reference.

11. The running-work processing machine according to claim 10, which further comprises:

first returning means for returning said second base from a predetermined position to a home position; and first switching means for switching said second base numerical control means over to said first returning means during at least part of a period other than the period of control of said second motor with said first base following the running of said work.

12. The running-work processing machine according to claim 11, wherein said first base supports a lower blade, sadi second base supports an upper blade, and said work is cut by said upper and lower blades.

* * * * *